United States Patent Office 3,767,726
Patented Oct. 23, 1973

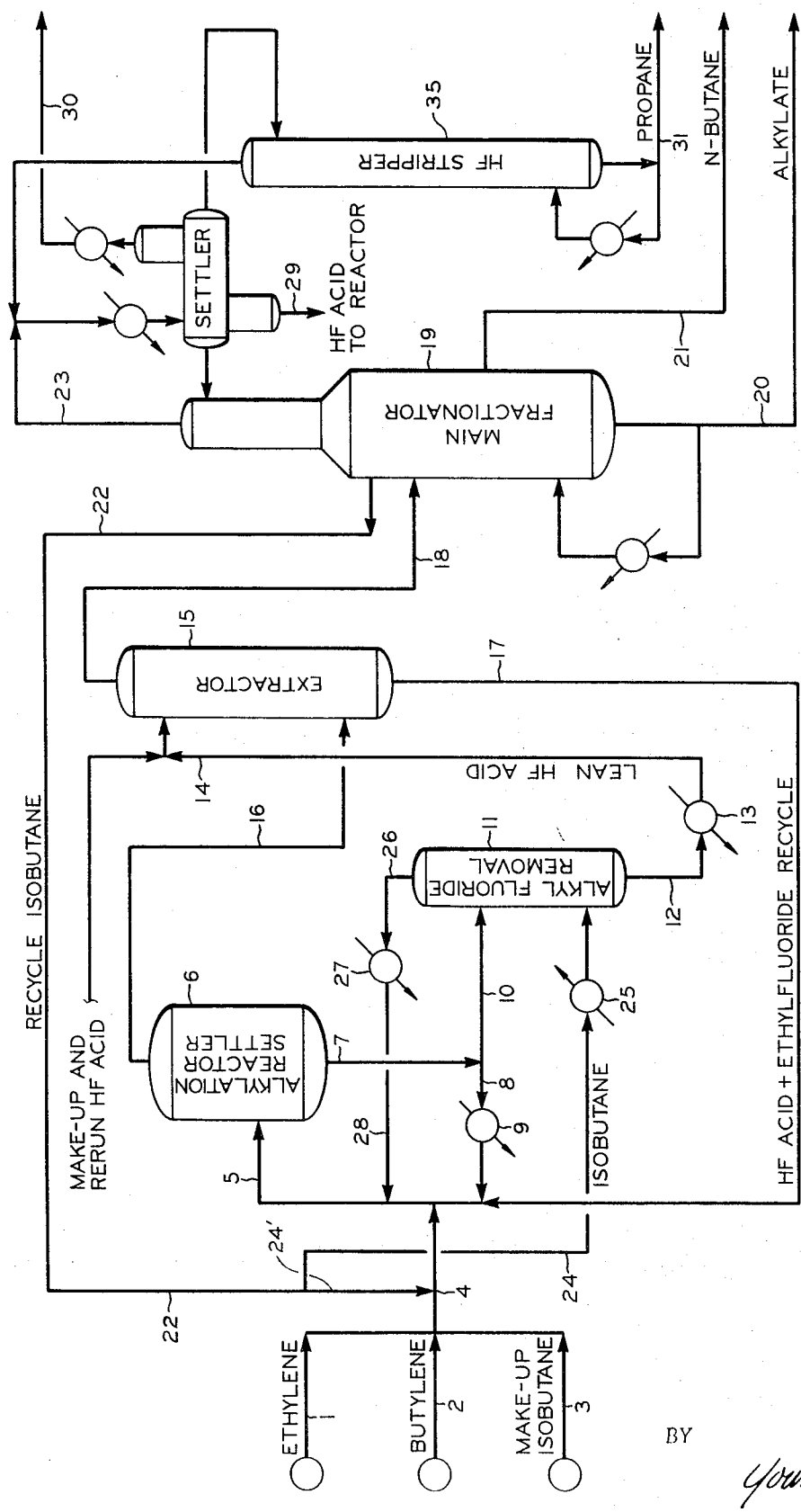

3,767,726
EXTRACTION OF ALKYL FLUORIDE FROM AN ALKYLATE HYDROCARBON WITH A LEAN HF ACID
Thomas Hutson, Jr., and Cecil O. Carter, Bartlesville, Okla., assignors to Phillips Petroleum Company
Filed Nov. 11, 1971, Ser. No. 197,835
Int. Cl. C07c 3/54
U.S. Cl. 260—683.42                                8 Claims

ABSTRACT OF THE DISCLOSURE

In the alkylation of an isoparaffin with an olefin in the presence of hydrofluoric acid as catalyst wherein the total feed stream is converted in part to alkyl fluoride, the alkylation reaction effluent stream containing alkyl fluoride is contacted with liquid hydrogen fluoride which has been treated by countercurrent extraction with a stream comprising isobutane, said treated hydrogen fluoride is used to extract the alkyl fluoride from the alkylation reaction effluent stream and both the alkyl fluoride enriched butane stream and the alkyl fluoride enriched hydrogen fluoride stream are recycled to the alkylation reaction zone.

BACKGROUND OF THE INVENTION

This invention relates to alkylation. In one of its aspects, it relates to the production of an alkylate by alkylation of an isoparaffin with an olefin employing hydrogen fluoride as the catalyst. In another of its aspects, the invention relates to an alkylation operation in which the total alkylation feed stream contains alkyl fluoride, e.g., ethyl fluoride, or in which operation alkyl fluoride is produced.

According to a concept of this invention, hydrofluoric acid supplied as the extraction medium for removal of alkyl fluoride, for example, ethyl fluoride or alkylate range fluorides, from an alkylation reactor effluent is subjected to a prior countercurrent extraction with a predominantly isobutane stream to increase the efficiency of the hydrofluoric acid as extracting agent for the alkyl fluoride. In another of its concepts, the invention provides alkyl fluoride free feedstock to the main fractionator of an alkylation reaction-recovery system by extracting alkylation reaction effluent with an extracting agent, e.g., stripped hydrofluoric acid, of improved efficiency for removing alkyl fluoride.

The invention will be described in connection with an operation in which isobutane is alkylated with ethylene in which there may or may not be present an alkylation promoter such as BF₃ or higher olefins such as propylene, isobutylene, or mixtures thereof. In such an alkylation it is possible that from about 10 to about 20 weight percent or more of the ethylene will react to form ethyl fluoride. It is known that higher concentrations of ethyl fluoride in the reaction mixture decrease the selectivity in the reaction for producing ethyl fluoride. The amount of ethyl fluoride produced is, however, sufficient to cause a substantial loss of feed and catalyst if the ethyl fluoride is not recovered.

We have now conceived that the ethyl fluoride can be recovered more efficiently by extraction of the alkylation reaction effluent with hydrofluoric acid which has been treated by countercurrent contact with a predominantly isobutane stream which produces a hydrofluoric acid which can efficiently remove all of the ethyl fluoride from the reaction effluent before the reaction effluent is subjected to fractionation for recovery of isobutanes, n-butane, alkylate product, propane, ethane, and residual hydrofluoric acid. We have further conceived that recycle of both the ethyl fluoride enriched hydrofluoric acid from the extraction of the alkylation reactor effluent and recycle of the ethyl fluoride enriched isobutane contact stream for reuse as reaction system feedstock results in elimination of ethyl fluoride from the product stream, thus increasing the overall efficiency of the reaction system for desired alkylate product.

It is an object of this invention to provide a process for the alkylation of isoparaffin with an olefin. Further, it is an object of this invention to provide an economical alkylation of an isoparaffin with ethylene in the presence of an alkylation promoter such as a higher olefin in a process in which there is formed unavoidably an alkyl fluoride. It is a still further object of this invention to provide an alkylation process in which the alkyl fluoride is removed from the product stream with facility and returned to the reactor feed streams. Another object of the invention is to provide a process as described wherein internal recycle streams are used to increase the efficiency of the process in producing the desired alkylate product. It is a still further object of the invention to provide a process as described wherein internal recycle streams are used to increase the efficiency of removal of alkyl fluoride from the alkylation reaction effluent prior to fractionation of the reactor effluent.

Other aspects, concepts, objects, and the several advantages of this invention are apparent from this disclosure, the drawing, and the appended claims.

SUMMARY OF THE INVENTION

According to the present invention, in the alkylation of an isoparaffin with an olefin, e.g., isobutane with ethylene, a higher olefin, e.g., propylene, isobutylene, and mixtures thereof, wherein there is formed unavoidably an alkyl fluoride, e.g., ethyl fluoride, there is provided a process which comprises treating the effluent from the alkylation reaction to separate the effluent into an alkylate containing hydrocarbon phase and a hydrogen fluoride phase, recovering a stream free of alkyl fluoride from the alkylate containing hydrocarbon phase by countercurrent extraction with a hydrofluoric acid stream, producing a recycle isobutane stream by fractionation of the alkyl fluoride free hydrocarbon stream, extracting at least part of the hydrofluoric acid phase separated from the reactor effluent using at least a portion of the recycle isobutane stream as extracting agent to produce the hydrofluoric acid stream used for extraction of the hydrocarbon phase, and recycling the alkyl fluoride containing extractants to the reaction zone.

The drawing is a diagrammatic representation of an alkylation operation according to this invention.

Referring now to the drawing, there are fed to the reaction zone, respectively, by 1, 2, and 3, ethylene, a heavier olefin used as an alkylation promoter, and make-up isobutane. As later described, these feeds, together with recycle butane, are fed by line 4 to alkylation riser reactor 5. The reaction mass is passed to settler 6.

A hydrofluoric acid phase is removed from settler 6 by 7. The stream is split with a portion returning through 8 and cooler 9 to the riser reactor 5. The remaining portion 10 is fed into alkyl fluoride removal tower 11 where it is brought into countercurrent contact with a predominantly preferably liquid isobutane recycle stream which removes reaction products, particularly ethyl fluoride and alkylate range fluorides, from the hydrofluoric acid. Hydrofluoric acid of high purity is removed through 12, cooler 13, and line 14 to be mixed up with make-up hydrofluoric acid of high purity and fed as extraction agent to extractor 15. Here the hydrofluoric acid is brought into liquid-liquid countercurrent contact with the hydrocarbon phase containing alkylate which has been removed from settler 6 by 16 and passed to the extractor 15. Hydrofluoric acid now rich with ethyl fluoride and any alkylate range fluorides is removed through 17 and returned to the riser reactor 5.

The hydrocarbon phase containing alkylate from which ethyl fluoride has been removed exits extractor 15 through 18 and is fed to the main fractionation column 19. From the fractionator 19 are removed an alkylate kettle product stream 20, a normal butane vapor side product stream from below the feed point 21, a recycle liquid isobutane side product stream from above the feed point via 22, and an overhead stream 23 containing propane, ethane and hydrofluoric acid. The overhead product stream 23 is further processed to remove hydrofluoric acid for return to the reactor via line 29 and to produce ethane 30 and propane 31 product streams, using HF stripper 35 as shown.

The liquid recycle isobutane stream 22 is split with a portion returning through 24' to conduit 4 and to the riser reactor 5. Another portion is returned through 24 and exchange 25 (optional in some operations) as extracting agent for alkyl fluoride removal tower 11. After countercurrent contact with the hydrofluoric acid stream in tower 11, the extract rich isobutane is returned through 26, cooler 27, and 28 to riser reactor 5. In some operations of tower 11, the isobutane 24 can be at least partly vaporized.

EXAMPLE

|  | Tons/day | Wt. percent | Bbls./day |
|---|---|---|---|
| Fresh feed (4): |  |  |  |
| Ethylene | 375.6 | 29.51 |  |
| Ethane | 3.8 | 0.30 | 59 |
| Ethyl fluoride | 0 | 0 | 0 |
| Propane | 5.7 | 0.45 | 64 |
| Isobutane | 778.2 | 61.15 | 7,908 |
| n-Butane | 32.7 | 2.57 | 320 |
| Butenes | 76.7 | 6.02 | 731 |
| Total | 1,272.7 | 100.00 | 9,082 |
| Combined reactor feed (5): |  |  |  |
| Ethylene | 375.6 | 0.67 |  |
| Ethane | 7.7 | 0.01 | 117 |
| Ethyl fluoride | 11,037.0 | 19.59 | 210,227 |
| Propane | 109.5 | 0.19 | 1,236 |
| Isobutane | 10,637.7 | 18.88 | 114,666 |
| n-Butane | 628.1 | 1.12 | 6,148 |
| Butenes | 76.7 | 0.14 | 731 |
| Hydrogen fluoride | 33,294.2 | 59.11 | 192,164 |
| Water | 140.1 | 0.25 | 800 |
| Acid soluble oils | 23.4 | 0.04 | 139 |
| Total | 56,330.0 | 100.00 | 526,228 |
| Settler (6) bottoms (7): |  |  |  |
| Hydrogen fluoride | 33,294.2 | 71.28 | 192,164 |
| Ethyl fluoride | 10,570.3 | 22.63 | 201,338 |
| Isobutane | 2,681.1 | 5.74 | 27,245 |
| Water | 140.1 | 0.30 | 800 |
| Acid soluble oils | 23.4 | 0.05 | 139 |
| Total | 46,709.1 | 100.00 | 421,686 |
| Settler bottoms (8) to reactor (5): |  |  |  |
| Hydrogen fluoride | 31,656.7 | 71.28 | 182,715 |
| Ethyl fluoride | 10,050.4 | 22.63 | 191,429 |
| Isobutane | 2,549.2 | 5.74 | 25,827 |
| Water | 133.2 | 0.30 | 761 |
| Acid soluble oils | 22.2 | 0.05 | 132 |
| Total | 44,411.7 | 100.00 | 400,864 |
| HF (10) to tower (11): |  |  |  |
| Hydrogen fluoride | 1,637.6 | 71.28 | 9,452 |
| Ethyl fluoride | 519.9 | 22.63 | 9,903 |
| Isobutane | 131.9 | 5.74 | 1,340 |
| Water | 6.9 | 0.30 | 39 |
| Acid soluble oils | 1.1 | 0.05 | 6 |
| Total | 2,297.4 | 100.00 | 20,740 |
| Tower (11) bottoms (12): |  |  |  |
| Hydrogen fluoride | 1,636 | 94.2 | 9,442 |
| Ethyl fluoride | 40 | 2.3 | 762 |
| Isobutane | 54 | 3.1 | 549 |
| Water | 7 | 0.1 | 40 |
| Acid soluble oils | 0 | <0.1 | 0 |
| Total | 1,737 | 100.0 | 10,793 |
| HF acid (14) to extractor (15) | 1,737 |  | 10,793 |
| Reactor effluent (16): |  |  |  |
| Ethylene | 7.7 | 0.08 |  |
| Ethane | 7.7 | 0.08 | 117 |
| Ethyl fluoride | 466.7 | 4.85 | 8,889 |
| Propane | 109.5 | 1.14 | 1,236 |
| Isobutane | 7,170.8 | 74.53 | 72,868 |
| n-Butane | 628.1 | 6.53 | 6,148 |
| Alkylate | 1,230.4 | 12.79 | 10,322 |
| Total | 9,620.9 | 100.00 | 99,580 |

|  | Tons/day | Wt. percent | Bbls./day |
|---|---|---|---|
| Extract (hydrocarbons) (17): |  |  |  |
| Ethylene | 0 | 0 | 0 |
| Ethane | 0.1 | 0.01 | 2 |
| Ethyl fluoride | 479.9 | 67.20 | 3,222 |
| Propane | 2.9 | 0.41 | 33 |
| Isobutane | 214.1 | 29.98 | 2,176 |
| n-Butane | 16.9 | 2.37 | 165 |
| Alkylate | 0.2 | 0.03 | 2 |
| Total | 714.1 | 100.00 | 5,600 |
| Main fractionator (19) charge (18): |  |  |  |
| Ethylene | 0 | 0 | 0 |
| Ethane | 7.6 | 0.08 | 115 |
| Ethyl fluoride | 0 | 0 | 0 |
| Propane | 106.6 | 1.10 | 1,203 |
| Isobutane | 7,742.5 | 79.84 | 78,678 |
| n-Butane | 611.2 | 6.30 | 5,982 |
| Alkylate | 1,230.2 | 12.68 | 10,320 |
| Total | 9,598.1 | 100.00 | 96,298 |
| Product alkylate (20): |  |  |  |
| Isopentane | 10.70 | 0.87 | 98.1 |
| n-Pentane | 0.62 | 0.05 | 5.6 |
| 2,2-dimethylbutane | 4.43 | 0.36 | 38.8 |
| 2,3-dimethylbutane | 597.88 | 48.61 | 5,136.4 |
| 2-methylpentane | 16.61 | 1.35 | 143.9 |
| 3-methylpentane | 8.24 | 0.67 | 70.5 |
| n-Hexane | 0.0 | 0.00 | 0 |
| 2,2-dimethylpentane | 0.0 | 0.00 | 0 |
| 2,4-dimethylpentane | 1.35 | 0.11 | 11.4 |
| Triptane | 0.0 | 0.00 | 0 |
| 3,3-dimethylpentane | 0.0 | 0.00 | 0 |
| 2-methylhexane | 0.25 | 0.02 | 2.1 |
| 2,3-dimethylpentane | 0.74 | 0.06 | 6.1 |
| 3-methylhexane | 0.37 | 0.03 | 3.1 |
| 2,2,4-trimethylpentane | 396.77 | 32.26 | 3,262.9 |
| 2,5-dimethylhexane | 8.36 | 0.68 | 68.5 |
| 2,4-dimethylhexane | 13.28 | 1.08 | 107.9 |
| 2,2,3-trimethylpentane | 6.52 | 0.53 | 51.8 |
| 2,3,4-trimethylpentane | 77.99 | 6.34 | 617.0 |
| 2,3,3-trimethylpentane | 52.16 | 4.24 | 408.8 |
| 2,3-dimethylhexane | 15.01 | 1.22 | 119.9 |
| 2-methylheptane | 0.0 | 0.00 | 0 |
| 3,4-dimethylhexane | 2.09 | 0.17 | 16.5 |
| 3-methylheptane | 0.0 | 0.00 | 0 |
| 2,2,5-trimethylhexane | 0.25 | 0.02 | 2.0 |
| Residue | 16.48 | 1.34 | 148.7 |
| Total | 1,230.10 | 100.00 | 10,320.0 |
| n-Butane side draw (21): |  |  |  |
| Isobutane | 4.9 | 13.00 | 50 |
| n-Butane | 32.7 | 86.74 | 320 |
| Alkylate | 0.1 | 0.26 | 1 |
| Total | 37.7 | 100.00 | 371 |
| Recycle isobutane (22): |  |  |  |
| Ethylene | 0.0 | 0 | 0 |
| Ethane | 3.8 | 0.04 | 58 |
| Ethyl fluoride | 0.0 | 0 | 0 |
| Propane | 100.9 | 1.20 | 1,139 |
| Isobutane | 7,737.7 | 91.70 | 78,630 |
| n-Butane | 595.4 | 7.06 | 5,828 |
| Total | 8,437.8 | 100.00 | 85,655 |
| Contact isobutane (24): |  |  |  |
| Ethylene | 0 | 0 | 0 |
| Ethane | 1.6 | 0.04 | 24 |
| Ethyl fluoride | 0 | 0 | 0 |
| Propane | 47.1 | 1.20 | 532 |
| Isobutane | 3,596 | 91.70 | 36,542 |
| n-Butane | 276.9 | 7.06 | 2,710 |
| Total | 3,921.6 | 100.00 | 39,808 |
| Overhead (26) of tower (11): |  |  |  |
| Ethylene | 0 | 0 | 0 |
| Ethane | 1.3 | 0.03 | 20 |
| Ethyl fluoride | 479.9 | 10.73 | 9,141 |
| Propane | 39.4 | 0.88 | 445 |
| Isobutane | 3,673.9 | 82.14 | 37,333 |
| n-Butane | 276.9 | 6.19 | 2,710 |
| Hydrogen fluoride | 1.6 | 0.03 | 9 |
| Total | 4,473.0 | 100.00 | 49,658 |
| Ethane product (30) | 3.8 |  | 59 |
| HF stripper bottoms (31); Propane | 5.7 |  | 64 |

Alkylate properties:

| API gravity | 76 |
|---|---|
| Liquid density, lbs. bbl. | 238.4 |
| ASTM dist. end point, °F. | 317 |
| RON +0 | 100.9 |
| MON +0 | 94.8 |
| RON +3 | 115.3 |
| MON +3 | 110.8 |

Reactor conditions:

| | |
|---|---|
| Catalyst/hydrocarbon vol. ratio | 4:1 |
| Isobutane to olefin mole ratio | 10:1 |
| Temperature, °F. | 90 |
| Pressure, p.s.i.g. | 190 |
| Residence time, sec. | 60 |
| Ethylene conversion (single pass), percent | 98 |
| Alkylate yield: | |
| Lbs./lb. olefin | 2.72 |
| Bbl./100 lbs. olefin | 1.141 |

It has been observed, as stated before, that an increased amount of ethyl fluoride in the reactor retards the formation of more ethyl fluoride and that recycle of the ethyl fluoride to the reactor also increases the conversion of ethyl fluoride to alkylate so that an additional amount of high quality alkylate is formed.

The isoparaffins which can be used in our process include isobutane and/or isopentane. The olefins, in addition to the required ethylene, can include propylene, butylenes, amylenes, and hexenes, either alone or in combination.

The ranges of isoparaffins to olefins in mole ratios can be about 1.5:1 up to about 20:1 or higher.

The catalyst to hydrocarbon volume ratios can be about 1:1 to about 10:1.

The hydrofluoric acid catalyst used can be about 80 percent by weight up to about 100 percent by weight hydrogen fluoride, other components being water, usually less than about 5 percent, and acid soluble oils.

Reactor temperatures can be about 40° F. to about 175° F. with pressures being sufficient to maintain the now preferred liquid phase system.

The weight ratio of liquid hydrofluoric acid solvent to ethyl fluoride to be absorbed can range from about 1:1 up to about 5:1.

Fractionation conditions are well known in the prior art.

Although the invention has been described as being primarily applicable and the now contemplated best mode is as production of diisopropyl from isobutane and ethylene reacted in the presence of a hydrofluoric acid catalyst, it is known that an amount of a heavier olefin will promote an increased conversion of ethylene to alkylate. It will be obvious to one skilled in the art in possession of this disclosure having studied the same that the invention and its concepts can have other applications.

Reasonable variation and modification are possible within the scope of the foregoing disclosure, the drawing and the appended claims to the invention the essence of which is that alkyl fluoride can be effectively removed from an alkylation reactor effluent stream before fractionation of the alkylate containing hydrocarbon portion of the reactor effluent by the extraction of the hydrocarbon stream using a high purity hydrofluoric acid produced by stripping reaction product from the hydrofluoric acid phase of the reactor product effluent.

We claim:

1. A process for the alkylation of an isoparaffin with olefin in the presence of a hydrofluoric acid catalyst which comprises:
   (1) conducting said alkylation in an alkylation zone to produce an alkylate reaction mixture which contains alkyl fluoride,
   (2) separating said mixture into an alkylate-containing hydrocarbon phase and a hydrofluoric acid phase,
   (3) extracting said alkylate-containing hydrocarbon phase with a treated hydrofluoric acid stream, said treated hydrofluoric acid stream having been substantially reduced in alkyl fluoride content as hereinafter delineated, thereby transferring alkyl fluoride from said alkylate-containing hydrocarbon phase to form a hydrofluoric acid stream containing alkyl fluoride,
   (4) fractionating said alkylate-containing hydrocarbon stream from which alkyl fluoride has been transferred to separate a recycle isoparaffin stream,
   (5) contacting at least a portion of said recycle isoparaffin stream with at least part of the hydrofluoric acid phase separated from the reaction mixture thereby transferring alkyl fluoride from said hydrofluoric acid phase to said isoparaffin stream to obtain the treated hydrofluoric acid stream used in step (3), and
   (6) recycling said hydrofluoric acid stream containing alkyl fluoride and the isoparaffin stream containing alkyl fluoride to the reaction zone.

2. A process according to claim 1 wherein olefin is ethylene.

3. A process according to claim 2 wherein the isoparaffin is isobutane which is passed as extraction agent in contact with at least part of the hydrofluoric acid phase separated from the reactor effluent thereby transferring alkyl fluoride from the hydrofluoric acid phase to the isobutane to obtain the treated hydrofluoric acid stream used for extraction of the hydrocarbon phase and the isobutane containing extracted alkyl fluoride is recycled to the reaction zone.

4. The process according to claim 1 wherein the fractionation producing said recycle isoparaffin stream also produces a normal butane stream, an alkylate product stream, and a stream containing ethane and propane.

5. The process according to claim 4 wherein the stream containing ethane and propane is further treated to remove residual hydrofluoric acid, said hydrofluoric acid being recycled to the reaction zone.

6. The process according to claim 1 wherein at least one higher olefin is present in the alkylation feed mixture as an alkylation promoter.

7. A process according to claim 7 wherein the isoparaffin is isobutane.

8. The process according to claim 6 wherein the higher olefins are chosen from the group consisting of propylene and isobutylene.

References Cited
UNITED STATES PATENTS

| | | | |
|---|---|---|---|
| 3,073,878 | 1/1963 | Johnson | 260—683.48 |
| 3,204,010 | 8/1965 | Van Pool | 260—683.42 |
| 3,410,759 | 11/1968 | Fontenot et al. | 260—683.48 |

DELBERT E. GANTZ, Primary Examiner

G. J. CRASANAKIS, Assistant Examiner

U.S. Cl. X.R.

260—683.48